United States Patent [19]

Crowley

[11] Patent Number: 4,851,918
[45] Date of Patent: * Jul. 25, 1989

[54] SEQUENTIAL PLANE PROJECTION BY LASER VIDEO PROJECTOR

[75] Inventor: Ronald P. Crowley, Salem, Mass.

[73] Assignee: Corporation for Laser Optics Research, Cambridge, Mass.

[*] Notice: The portion of the term of this patent subsequent to Jan. 19, 2005 has been disclaimed.

[21] Appl. No.: 144,546

[22] Filed: Jan. 13, 1988

Related U.S. Application Data

[63] Continuation of Ser. No. 604,308, Apr. 26, 1984, Pat. No. 4,720,747.

[51] Int. Cl.⁴ .............................................. H04N 5/74
[52] U.S. Cl. ..................................... 358/231; 358/60; 358/235; 350/358
[58] Field of Search ................. 358/231, 60, 235, 61; 350/358

[56] References Cited

U.S. PATENT DOCUMENTS

| | | | |
|---|---|---|---|
| Re. 29,670 | 6/1978 | Spaulding | 358/60 X |
| 3,783,185 | 1/1974 | Spaulding | 358/235 X |
| 3,818,129 | 6/1974 | Yamamoto | 358/235 X |
| 3,894,182 | 7/1975 | Yamamoto et al. | 358/235 X |
| 3,929,970 | 12/1975 | Isaacs et al. | 350/358 X |
| 3,935,566 | 1/1976 | Snopko | 358/235 X |
| 3,944,335 | 3/1976 | Saito et al. | 350/358 |
| 3,953,107 | 4/1976 | Yano et al. | 350/358 X |
| 3,994,569 | 11/1976 | Isaacs et al. | 350/358 |
| 4,217,036 | 8/1980 | Chang | 350/358 |
| 4,422,154 | 12/1983 | Smithline et al. | 350/358 X |
| 4,505,550 | 3/1985 | Steinbruegge | 350/358 X |
| 4,582,397 | 4/1986 | Chang | 350/358 X |
| 4,602,342 | 7/1986 | Gottlieb et al. | 350/358 X |
| 4,720,747 | 1/1988 | Crowley | 358/231 |

*Primary Examiner*—James J. Groody
*Assistant Examiner*—Mark R. Powell
*Attorney, Agent, or Firm*—Richard P. Crowley

[57] ABSTRACT

A video imaging system is disclosed. The system is responsive to electrical signals introduced into it, which electrical signals represent an image. The system includes an acoustic-optical cell, the cell including an anisotropic medium for sound transmittal. The electrical signals are received, and optionally compressed, before being introduced into transducers mounted on the cell. The transducers convert the electrical signals into sound waves which traverse the width of the cell. After substantially a full line of display of the image is traveling through the cell, a monochromatic light source, such as a metal vapor pulsed laser, is pulsed for a time duration less than the propagation time of a single pixel across or transverse to the sound signal in the cell. This modulates the monochromatic light which is then focused and displayed on the screen at the appropriate position for the line of image.

8 Claims, 7 Drawing Sheets

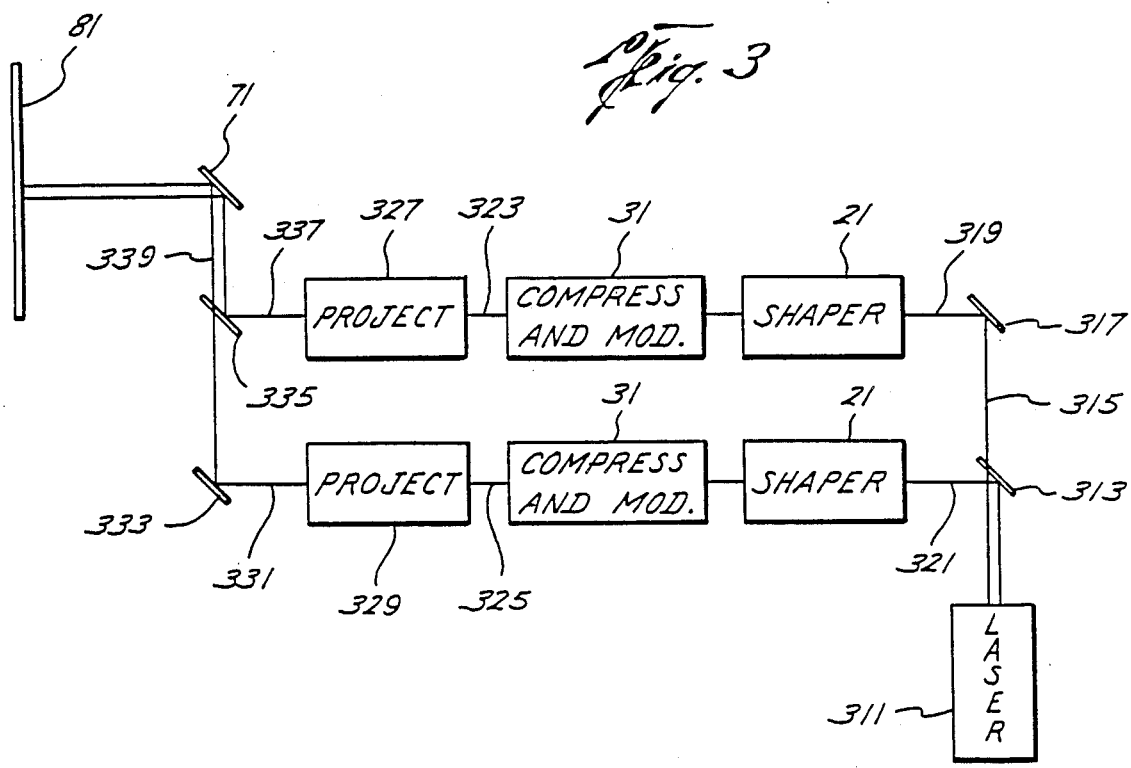
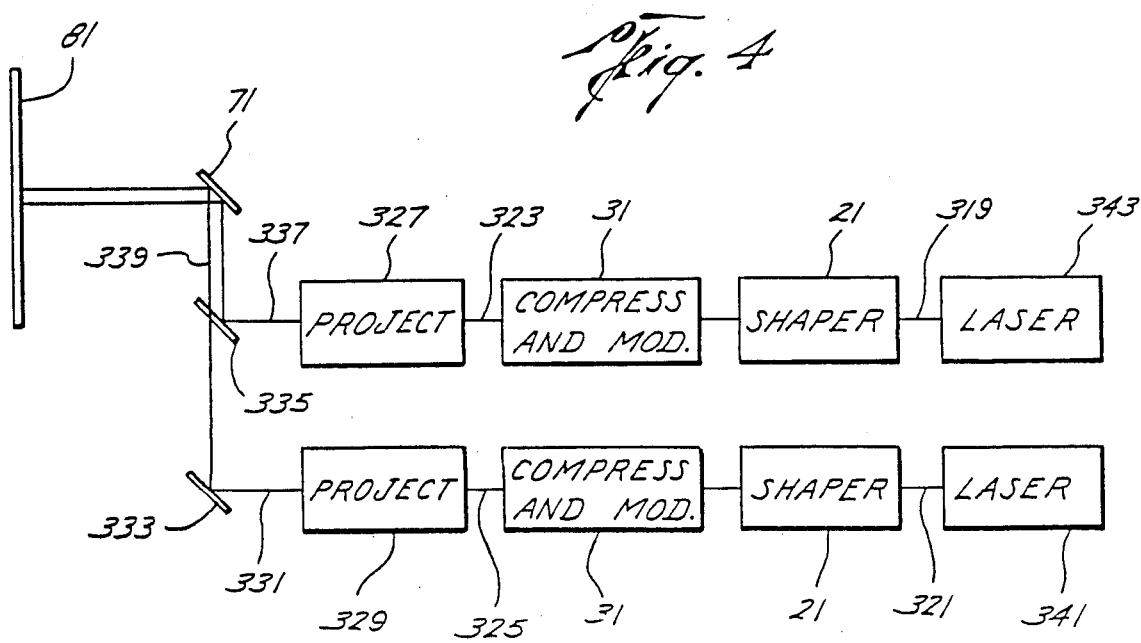

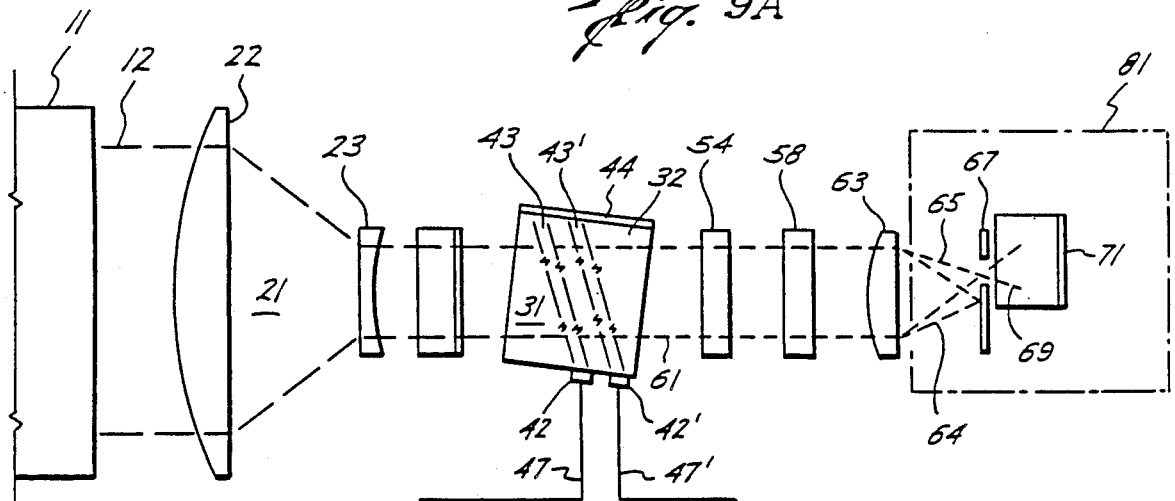
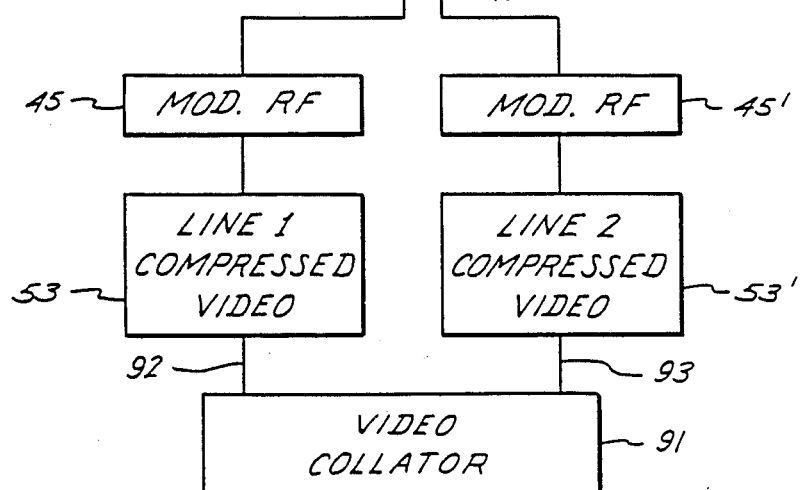
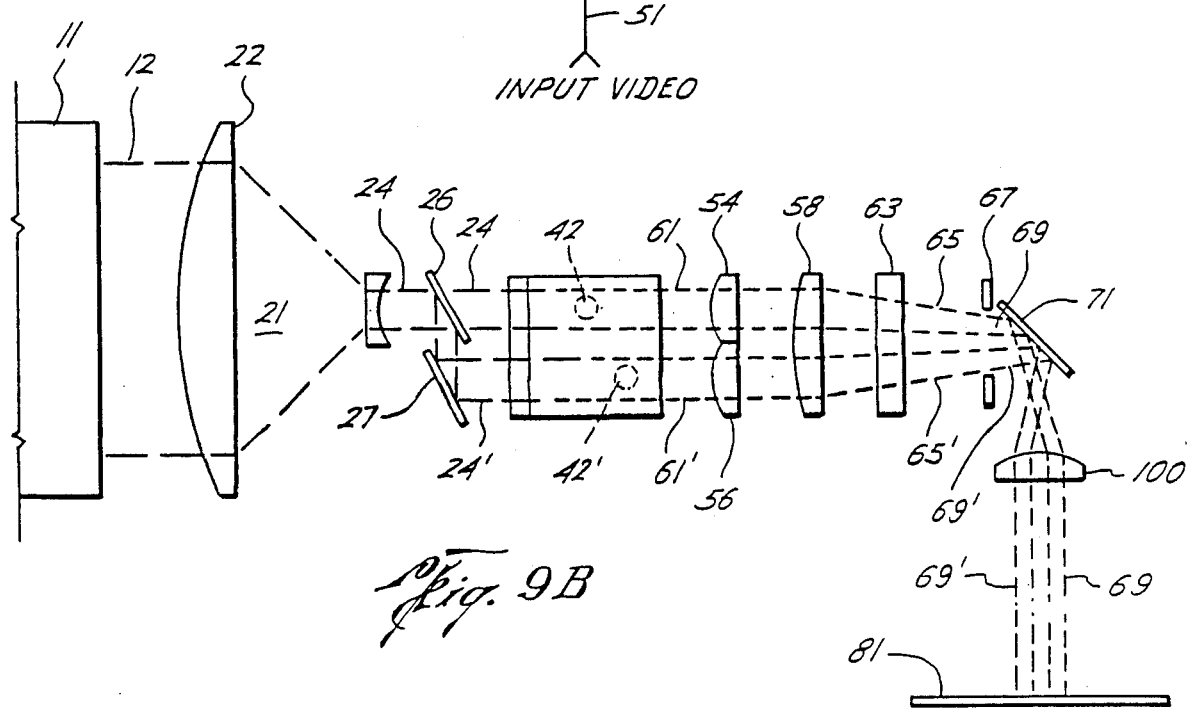

SEQUENTIAL PLANE PROJECTION BY LASER VIDEO PROJECTOR

This is a continuation of co-pending application Ser. No. 604,308 filed on Apr. 26, 1984, now U.S. Pat. No. 4,720,747.

TECHNICAL FIELD

The invention relates to video projectors using lasers for a light source. More specifically, it relates to acoustic-optical modulated laser video projectors.

BACKGROUND ART

Lasers, while a realtively new phenomenon, have become relatively commonplace in technology. Continuous and pulse lasers are well known in laser applications. See, for example, U.S. Pat. No. 3,721,756, issued Mar. 20, 1973, to C. E. Baker with regard to continuous lasers. For pulse lasers, see, for example U.S. Pat. Nos. 4,206,347, issued June 3, 1980 to Avicola; and 4,308,507, issued Dec. 29, 1981, to Pelasance, et al. A relatively new development in pulse lasers are metal vapor lasers. See, for example, U.S. Pat. Nos. 3,831,107, issued Aug. 20, 1974, to Karras; 4,048,587, issued Sept. 13, 1977 to Liu, et al; 4,247,830, issued Jan. 27, 1981, to Karras, et al; 4,295,103, issued Oct. 13, 1981, to Ljudmirsky; and 4,328,464, issued May 4, 1982, to Pivirotto. For further discussions about pulsed lasers, see also U.S. Pat. Nos. 4,107,701, issued Aug. 16, 1978, to Sprague, et al; 3,725,812, issued Apr. 3, 1973, to Scott; 3,896,397, issued July 27, 1975, to De Wit, et al; 3,904,987, issued Sept. 9, 1975, to Cheng; 3,936,769, issued Feb. 3, 1976, to De Wit, et al; Re 29421, issued Sept. 27, 1977, to De Witt, et al; 3,982,203, issued Sept. 21, 1976; 4,057,770, issued Nov. 8, 1977, to Henningsen, et al; 4,105,953, issued Aug. 8, 1978, to Jernigan; 4,227,159, issued Aug. 8, 1978, to Jernigan; 3,392,260, issued July 9, 1968, to Dernback; 3,465,358, issued Sept. 2, 1969, to Bridges; 3,506,928, issued Apr. 14, 1970, to Korpel; 3,544,916, issued Dec. 1, 1970, to Angelbeck; 3,566,303, issued Feb. 23, 1971, to De Maria; 3,613,024, issued Oct. 12, 1971, to Geusic; and 3,916,338, issued Oct. 28, 1975, to Jensen, et al.

The use of lasers in the production of images, and in particular, the production of a sequential set of electrical signals which represents an original picture for direct display through the use of lasers ("video imaging") is also know in the art. See, for example, U.S. Pat. Nos. to Baker, supra; 3,737,573, issued June 5, 1973 to Kessler; 3,818,129, issued June 18, 1974 to Yamamoto; 3,958,863, issued May 25, 1976, to Isaacs, et al; 3,977,770, issued Aug. 31, 1976 to Isaacs, et al; 3,994,569, issued Nov. 30, 1976, to Isaacs, et al; U.S. Pat. No. 3,636,251, issued Jan. 18, 1976, to Daly, et al. See also, "High-Quality Laser Color Television Display", by Taneda, et al, reprinted from the Journal of the Society of Motion Pictures and Television Engineers, June 1973, Volume 82, No. 6; "A 1125 Scanning-Line Laser Color TV Display" by Taneda, et al, published and presented at the 1973 SID International Symposium and Expedition; and "Laser Displays" by Yamamoto, reprinted from Advances and Image Pick-up and Display, Volume 2 of the Academic Press, Inc. in 1975. For general references to video imaging, see U.S. Pat. Nos. 3,507,984, issued Apr. 21, 1970, to Stavis; 3,727,001, issued Apr. 10, 1973, to Gottlieb; and 3,636,251, issued Jan. 18, 1972, to Daly, et al.

It is also known in the art to use isotropic Bragg cells and acoustic-optical modulation with video imaging systems as discussed in the patent to Yamamoto, supra, the patents to Isaacs, supra, and the articles supra.

Because of the short pulse duration and high average power, Nd:Yag Q-switched lasers were choosen by Yamamoto. The infra red light emission, which was converted into second harmonic waves by using an appropriate non-linear optical crystal, provided the necessary visible light. For example, the 1.06-micron spectral line emission is converted into green light which has a wave length of approximately 0.534 microns. The 1.318-micron spectral line emission is converted into red light which has a wave length of approximately 0.660 microns. Because of the impractical operation, the 0.946-micron spectral line emission was not used to obtain the blue line. Instead, optical mixing of 1.32 microns and 0.660 microns and converted into an additional wave length of approximately 0.439 microns.

Although the theory of second harmonic generation and parametric mixing in non-linear crystals appears to be a realistic solution, the practical limitations are too severe. The prior art examples show a situation that uses a luminous flux of one thousand lumens, with two watts of green and approximately ten watts each of red and blue. The conversion efficiency of the non-linear crystals is poor, being less than twenty percent in the best of cases. Ten watts of red couldn't be obtained; ten watts of blue could hardly be achieved. The amount of radiation inciding on the crystal would have to be of significant energy level to achieve the required light; achieving this would lead to the destruction of the non-linear crystals. The luminous efficiency of the red and blue lines, when taking the spectral response curve of the human retina into consideration, is so low that the amount of light needed is in exceess of the limits imposed by the Nd:Yag laser family, although the reproducable color spectrum is excellent for low luminosity.

Because of the low luminous efficiency of red 0.660 microns and blue 0.440 microns, dye laser systems were proposed in the prior art. The green 0.532-micron emission was used as the pumping source and a solution of a florescent dye was used as the active medium, to produce the red laser light which is tunable, allowing the selection of a spectral line having relatively high luminosity. This does not really solve the problem because twice as much green is now needed, and the relatively poor efficiency incurred by the addition of pumping A dye CELL is a disadvantage. Similarly, blue light which is tunable requires ultra-violet light, which has a wave length of approximately 0.350 microns, to pump a dye laser. The ultra-violet was achieved by parametric mixing of 1.06 microns and the second harmonic 0.534 microns, the sum frequency being 0.350 microns. This requires, however, additional green light in order to produce the blue. Accordingly, prior art systems makes an impractical projector. Although the Nd:Yag has relatively good overall energy to light efficiency, the applicable mixing hinders the practical application.

For general references to Bragg cells, both anisotropic and isotropic, including shear cut and shear wave propagation of radio frequencies, sometimes referred to as shear Bragg defraction, see U.S. Pat. Nos. 3,644,015, issued Feb. 22, 1972, to Hearn; 3,653,765, issued Apr. 4, 1972, to Hearn; 3,701,583, issued Oct. 21, 1972, to Hammond; 4,052,121, issued Oct. 4, 1977, to Chang; 4,110,016, issued Aug. 29, 1978, to Derg, et al; 4,126,834, issued Nov. 21, 1978, to Coppock; 4,201,455, issued May 6, 1980, to Vadasz, et al; 4,339,821, issued July 13, 1982, to Coppock, et al; 4,342,502, issued Aug. 3, 1982, to Chang; 3,828,276, issued Aug. 6, 1974, to Cohen; 4,083,976, issued June 6, 1978, to Das; 3,485,559, issued Dec. 23, 1969 to De Maria; 4,371,964, issued Feb. 1, 1983, to Podmaniczky, et al; 3,389,348, issued June 18, 1968, to De Maria; 3,749,476, issued July 31, 1973, to Daly, et al; 4,000,493, issued Dec. 28, 1976, to Spaulding, et al; and 4,016,563, issued Apr. 5, 1977, to Pedinoff. For Bragg cells, perhaps used in video imaging systems, see U.S. Pat. No. 3,935,566, issued Jan. 27, 1976, to Seopko.

Generally, see also U.S. Pat. Nos. 4,115,747, issued Sept. 19, 1978, to Sato, et al; 4,229,079, issued Oct. 21, 1980, to Wayne, et al; 4,308,506, issued Dec. 29, 1981, to Ellis; 4,337,442, issued June 29, 1982, to Mauck; 3,633,995, issued Jan. 11, 1972, to Lean; and 3,711,791, issued Jan. 16, 1973, to Erickson; and 4,130,834, issued Dec. 19, 1978, to Mender, et al.

However, none of the prior art set out above discloses a system of a video projector which can equal the present system in such parameters as maximum light output capacity and energy-to-light conversion efficiency.

DISCLOSURE OF THE INVENTION

A video imaging system is disclosed using monochromatic light source, or sources, modulated by signals within an acoustic-optical cell or cells using an isotropic or anisotropic medium for modulation of the light from the light source or sources. Preferably, metal vapor lasers are used for the monochromatic light source. Further, shear wave propagation of the sound waves in an anisotropic acoustic-optical cell is preferred to reduce crystal size of the acoustic-optical cell. A data compression system for use with the acoustic-optical cell, to reduce the time period required to propagate sound waves which have been modulated to correspond to the electrical signals which correspond to a line of image, is also disclosed to minimize the size of the crystal in the acoustic-optical or Bragg cell. Such video imaging system is used to project monochromatic or mixed chromatic video images onto a projection surface by sequential line writing (plane projection) with sufficient resolution and brightness to substitute for and/or exceed the capabilities of conventional large and small screen imaging systems.

BRIEF DESCRIPTION OF THE DRAWINGS

For a further understanding of the nature and the objects of the present invention, reference is made to the following drawings in which like parts are given like reference numerals, and wherein:

FIG. 3 is a schematic drawing of an alternate embodiment of a multicolor imaging system of the present invention, with a single color source producing two monochromatic signals;

FIG. 4 is a schematic drawing of an alternate embodiment of the present invention of a multicolor imaging system showing two separate monochromatic sources;

FIG. 9A is schematic drawing of an alternate embodiment of the present invention of the imaging system utilizing simultaneous, multiple line writing; and FIG. 9B is a schematic drawing of the imaging system of FIG. 9A rotated ninety degrees.

DESCRIPTION OF THE INVENTION

1. Introduction

Figure 1A:
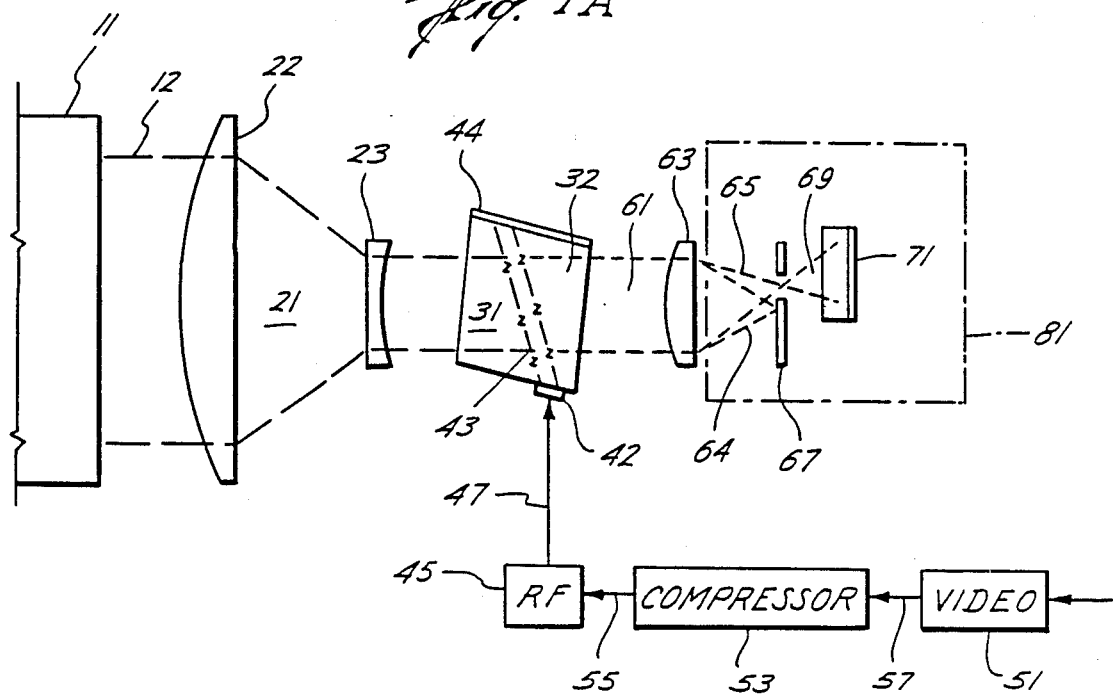
FIG. 1A is a schematic drawing of the imaging system of the preferred embodiment of the present invention using a single monochromatic source.

As used in the following description and the previous discussion, the following definitions shall apply:

(1) Video Imaging—A sequential set of electrical signals which represent an original picture.

(2) Pulsed Laser—Any laser source whose radiation is emitted in a non-continuous-mode burst which lasts for a finite period of time.

(3) Metal Vapor Pulsed Laser—A laser system that uses one or more pure metals or metal halides as a lasing medium, a means for vaporizing the metal or metals to the necessary vapor pressure, and a device to switch the operating current on and off at a particular repetition or "rep" rate.

(4) Bragg Cell—A device that changes the intensity of a light beam by the interaction between sound waves and the light in a solid medium.

(5) Anisotropic—That property of a material which determines the velocity of propagation of sound within the material, such that when tested along axes in different directions, the velocity of propagation is different in each direction.

(6) Isotropic—That property of a material that determines the velocity of propagation of sound within the material, such that when tested along axes in different directions, the velocity of propagation is the same in all directions.

(7) Shear Cut—A physical cut of the crystal in order to launch the sound waves at a shear angle; or, a physical mounting of the transducer to accomplish same.

(8) Shear Cut Propagation of RF—The propagation of the sound waves in an anisotropic medium, the direction of which is non colinear with a beam of light. Transverse sound waves may be launched with a specified transducer.

(9) Compression—A means for producing information corresponding to an original signal but whose time is shorter in comparison to the original length of time of the original signal.

(10) Shear Bragg Diffraction—In a longitudinal mode, the output diffraction angle is small (e.g., typically measured in milliradians). In a shear mode the output diffraction angle is high (e.g., typically measured in degrees). Shear Bragg diffraction is useful for deflectors and filters because it provides relatively high separation.

The use of sequential plane projection for video imaging systems through the use of metal vapor lasers, such as gold at 627 nm for red, copper at 510 nm for green, and bismuth at 472 nm for blue is disclosed below. It has been discovered that metal vapor lasers have typically much higher wattage output effeciency than do continuous or non-metal pulsed lasers in the visible spectrum.

Light from the metal vapor lasers is introduced to anistropic acoustic-optical crystals or Bragg cells for modulation. By the use of an anisotropic property of paratellurite crystals, with an acoustic wave traveling in a shear mode through the crystal, the length of crystal necessary to accommodate a full line of signal within the acoustical part of the system in order to modulate emitted light from the metal vapor laser, is significantly reduced. It is reduced to the point where crystals can be manufactured of an reasonable length to permit appropriate signal modulation in an economical manner. The shear waves also allow a higher resolution having a better diffraction efficiency in a relatively small crystal. This is compared with the crystal of Yamamoto, supra.

However, there is an alternate or additional way to minimize the length of the crystal through data compression as discussed infra. The compression may be used in conjunction with the anisotropic crystals, as well as isotropic crystals. For understanding this, one must recognize that the length of a standard NTSC video raster scan line, for example, is 63.5 microseconds including a blanking sync interval. Because the light source (metal vapor laser) is pulsed, and the time length of the pulse may be less than or equal to the time required to write a pixel of information on the projection surface in real time ("pixel of time"), the light which is to be modulated by means of acoustic-optical modulation need be introduced only after the entire line is compressed and fully propagated along the crystal; i.e., the modulated line of an RF signal is fully within and still traveling through the acoustic-optical crystal when the pulse of light occurs, the pulse occuring in less than a pixel of time. In the NTSC example, by limiting the light pulse time to approximately thirty nanoseconds or less per pulse, the pulse of light may be modulated to correspond to one full line, thus making available a significant amount of blanking time for the signal to die out in the crystal and for a new signal to be introduced by acoustic optical modulation.

Compression can be accomplished through the use of electrical signals, which corresponding to the original video source signals, and which are written into RAM at the video pixel input rate and read out of RAM at any faster rate, e.g. twice or more that rate. By buffering the video signal information and increasing its frequency, the length of the crystal needed to hold a horizontal line would be shortened, such as approximately one-half of the length that would be required for a non-compressed signal when the RAM read out rate is increased by a factor of two. Accordingly, for example, for fifty percent compression of data comprising video information, when the horizontal line starts to enter the crystal, there is an elapsed time of approximately thirty-one micro seconds (in the case of NTSC raster line) between the time the "horizontal line" of signal corresponding to a horizontal line of display starts to enter the crystal and when the last part of the full line of signal has entered the crystal (and the light pulse can thus commence). The compressor is preferably a double-buffered memory with a line of video data being written into one of the line buffers at the video real time frequency while the other line buffer waits the appropriate time and then reads said data out of RAM at the increased rate, such as twice as fast, to the crystal.

The modulated, pulsed light signal is then projected onto a projection surface.

2. Detailed Description of the Invention

Monochromatic System

Figure 1B:
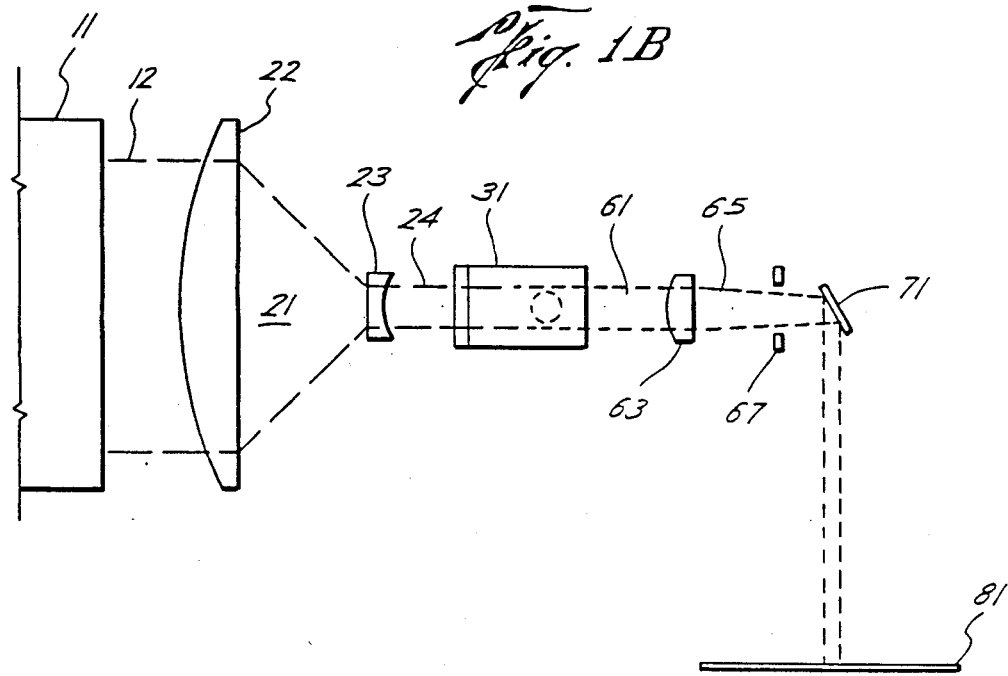
FIG. 1B is a schematic drawing of the imaging system of FIG. 1A rotated ninety degrees.

Referring to FIG. 1, there is shown a pulse-operated metal vapor laser 11 emitting monochromatic light 12 to optical system 21. Optical system 21 includes two cylindrical, anamorphic lenses 22, 23 which compress the monochromatic light from beam 12 into a narrow set of parallel rays 24 which are introduced into Bragg cell 31, or other suitable acoustic-optical light modulating device. Preferably, Bragg cell 31 uses an anisotropic acoustic-optical crystal 32 and has a transducer 42 mounted on a side non colinear to the path of beam 24. A wave absorber 44 is mounted on another side of anisotropic crystal 32 facing the side of anisotropic crystal 32 upon which transducer 42 is mounted, with acoustic waves 43 propogated between transducer 42 and absorber 44. Acoustic waves 43 are generated by transducer 42 and respond to signals from a radio frequency source 45 connected to transducer 42 by cable 47. Radio frequency source 45 may be stimulated directly by video signal receiver 51 or, as preferably shown in FIG. 1, may be driven by a data compression system 53 connected by cable 55 to RF source 45 with cable 57 connecting compressor 53 and video signal receiver 51.

As shown in the preferred embodiment of FIG. 1, the video compressor 53 serves to decrease the time required for sound waves 43 which correspond to a video line, to fully enter into the Bragg cell 31. The modulated output beam 61 is transmitted to cylindrical anamorphic lense 63 which is used for output projection. Lense 63 focuses the modulated light beam into a beam 65 which is projected onto optical slit 67. Optical slit 67 is positioned to block undiffracted light 64 exiting from the Bragg cell 31. The light beam 69 emitting from slit 67 is projected on a frame scanning mirror 71, such as a frame scanning galvanometer, and is thence positioned appropriately on a projection screen 81.

As seen in FIG. 1, beam 64 includes the undiffracted light exiting from crystal 32. This beam 64 is blocked by the optical slit 67 which keeps undiffracted light from reaching the projection screen 81. This is indicated by the lower dashed lines in FIG. 1. The dashed lines in FIG. 1, representing beam 65, indicate diffracted rays which are reflected by the mirror 71, such as a vibrating galvanometer, to the projection screen 81 at the particular line position which corresponds to the ordinal position of the corresponding line of video data of the original video signal received by the video signal receiver 51.

Preferably, the light modulation system or Bragg cell 31, uses anisotropic Bragg diffraction by shear waves traveling in a paratellurite crystal such as tellurium oxide ($TeO_2$) as a principle of modulation.

Compression

Figure 7:
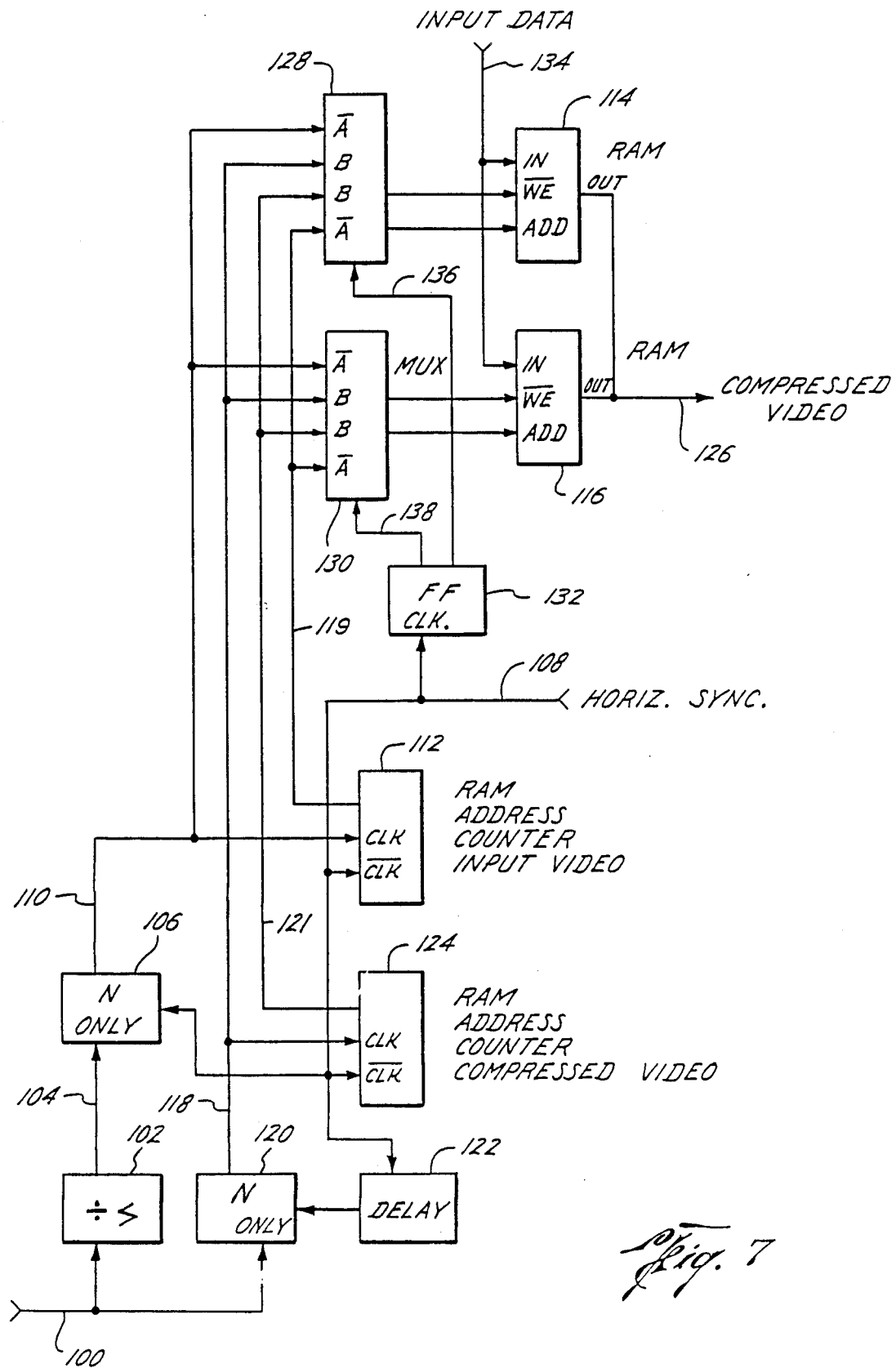
FIG. 7 is a block diagram showing the construction of the video compressor used in the imaging system of the preferred embodiment of the present invention.

The details of compressor 53 are shown in FIG. 7. The dot clock 100 is set to a frequency which represents the pixels along the compressed horizontal scan line. As in the example set out above, a scan line in an NTSC format is equal to approximately 63.5 micro-seconds, which includes approximately 10 micro-seconds for sync and blanking interval. As an example, if 512 pixels are included in the scanning time and the visual line equals approximately 53.5 micro-seconds, then, each pixel will have an update rate of approximately 100 nano-seconds.

As shown in FIG. 7, the dot clock signal 100 is divided by the compression value "S", which is, for purposes of this example, equal to two, by divider 102 and produces a signal 104. Signal 104 is used as a clock for the "N only" generator 106. The other input for "N only" generator 106 is the horizontal sync input 108. Every time a horizontal sync 108 arrives, the "N only" generator 106 will produce a series of N pulses 110. For a system as described above having 512 pixels per horizontal line, N would preferably be 512, with each pulse being approximately 100 nano-seconds long.

The N pulses 110 are used to clock the input video RAM address counter 112. Address counter 112 supplies the address codes 119 needed to address the random access memories 114, 116 described below. As discussed below, at the same time the input video is being sampled and the data is being loaded into one of the RAM arrays 114, 116, the other RAM array 116, 114 is being read out at a compressed rate represented by pulses 118 originating from a second "N only" generator 120. "N only" generator 120 is driven by dot clock 100 as well but has no divider. Therefore it will run at the higher clock rate needed for compression. Preferably pulses from "N only" generator 120 are at fifty nano-seconds, if the compression rate is to be twice as fast as the input rate, and the input clock is fifty nano-seconds. Accordingly, the horizontal sync 108 is delayed by delay circuit 122 before it triggers "N only" generator 120 in order the maintain synchronization. The delay is equal to the horizontal scan line width divided by the compression ratio "S". Expressed as an equation, the horizontal scan line "H" is divided by the compression ratio "S" to equal the compressed scan line "CH", or H/S=CH. Accordingly, (H—CH) is the delay time for delay circuit 122. For the example set out above, with "S" equal to two and "H" equal to the NTSC standard of 63.5 micro-seconds, the delay time would be approximately equal to 31.5 micro-seconds.

It should be noted that delay described here is prior to filling the crystal. Alternately, the crystal could be filled immediately and then the delay taken.

After the appropriate delay time, the "N only" generator 120 produces 512 compressed rate pulses 118 at a rate of 50 nano-seconds. Signal 118 is used to clock the output compressed video RAM address counter 124 which supplies the necessary code 121 to change the address of either of the RAM arrays 114, 116 for output. The output data 126 is sent to the RF source 45.

Figure 8:
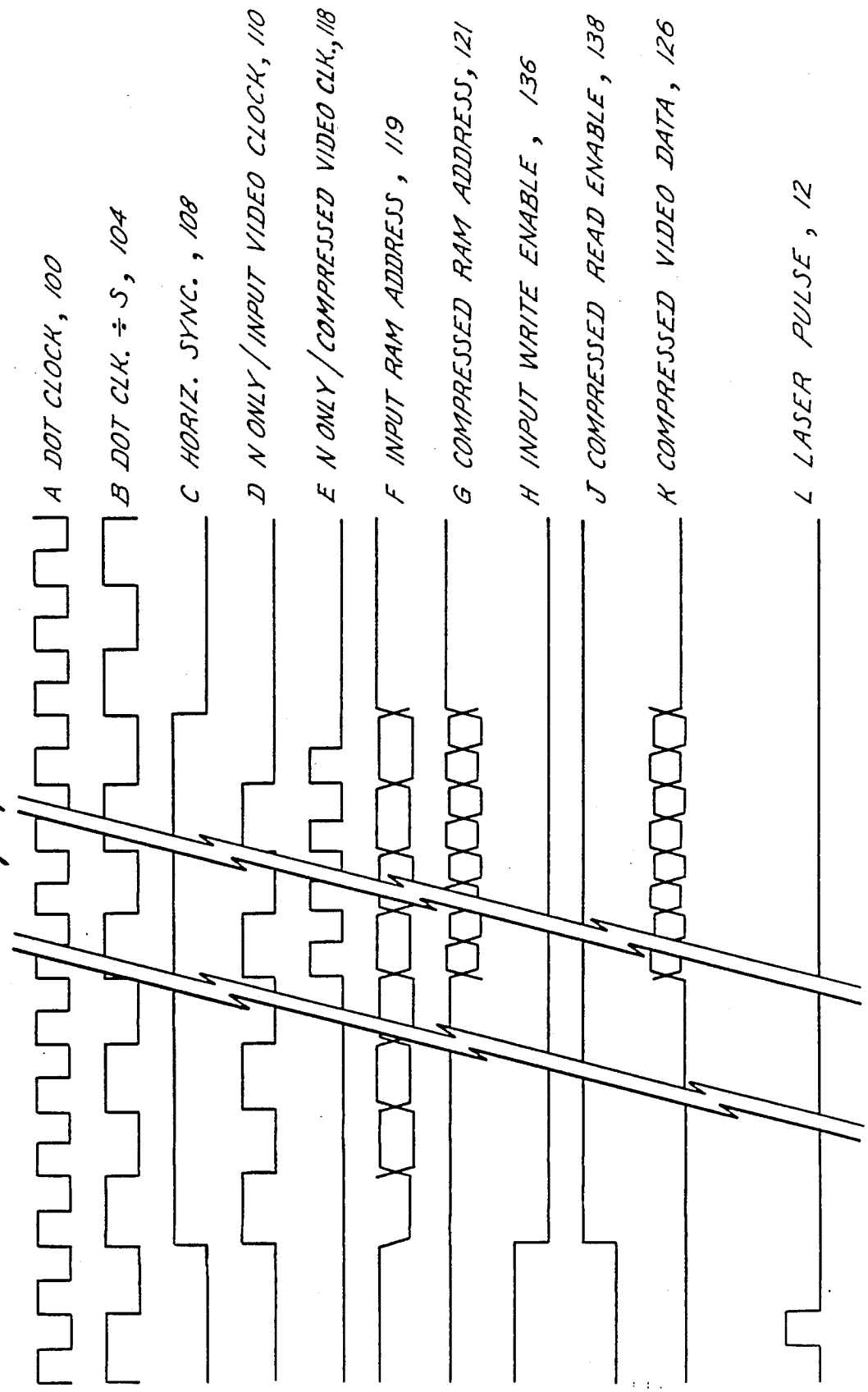
FIG. 8 is a timing diagram showing the timing signals related to the compressor and the laser pulse time of the preferred embodiment of the present invention.

Multiplexers 128, 130 and control flip flop 132 control the sequence of use of the RAM arrays 114, 116. The control flip flop 132 determines which input signals are to be supplied to the RAM array 114, 116. For example, in the first cycle, RAm array 114 may read at the compressed rate through output data bus 126, while RAM array 116 writes at the video rate from the video signal 134. The cycle is triggered or changed by horizontal sync pulse 108. When the next sync pulse 108 arrives, the control signals 136, 138 from flip flop 132 to multiplexers 128, 130, respectively, switch and cause the RAM arrays 114, 116, respectively to reverse roles. The data from signal 134 which has been written into RAM aray 116 will then be read at the compressed clock rate 118 while RAM array 114 inputs the next video scan line 134 at the rate set by clock pulses 110. The timing of these pulses is shown in the upper portion of the Timing Diagram of FIG. 8.

Acoustic-Optical Crystal

The length of the crystal 32, measured from the acoustic transducer 42 to the wave absorber 44, is set to be equal to the distance the acoustic wave 43 must propagate to accommodate one horizontal scan line, divided by the compression ratio "S". In this regard, the standard NTSC horizontal scan line "H" is equal to approximately 63.5 micro-seconds including blanking which takes about 10 micro-seconds, as discussed above.

Figure 6A:
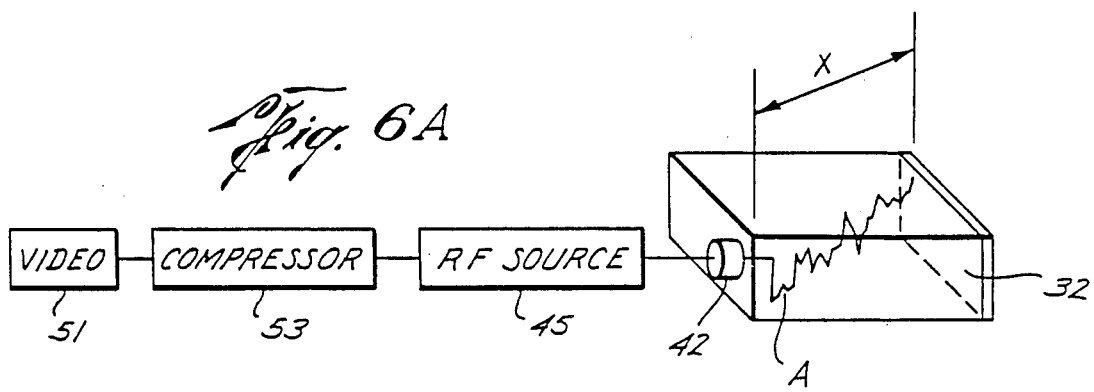
FIG. 6 is a set of three drawings showing a sequence of the acoustical modulation in the crystal of the preferred embodiment of the present invention, using a monochromatic source.
Figure 6B:
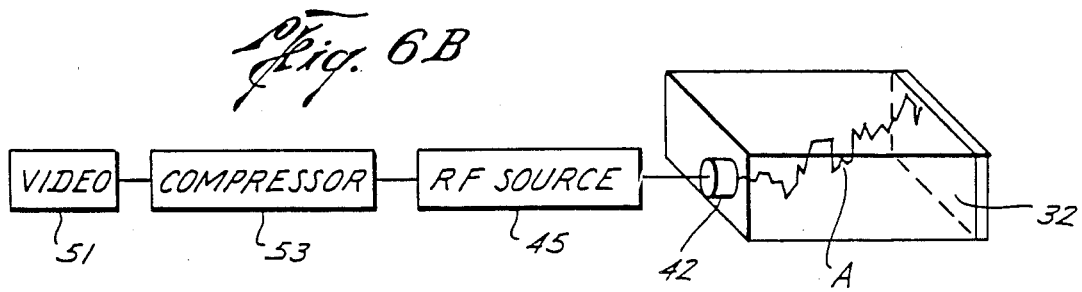
Figure 6C:
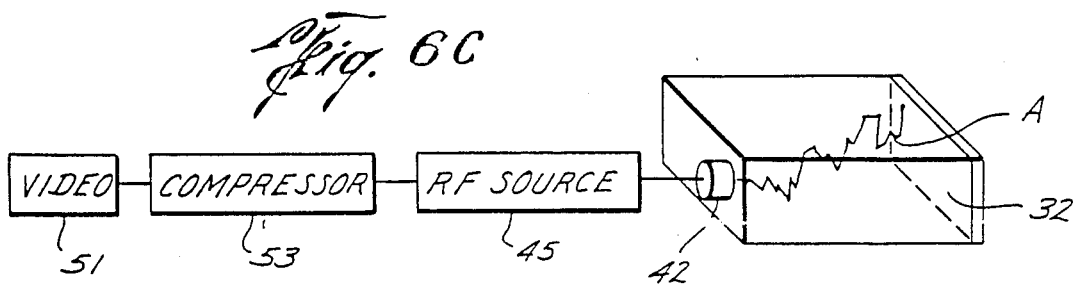

For use of the acoustic wave 43 in anisotropic crystal 32, one should remember that because the output of the radio frequency generator 45 is amplitude modulated by the compressed video signal system 53, the acoustic waves to crystal 32 are also amplitude modulated. In this regard, the laser beam shaping optics 21 are used to compress the laser beam into narrow parallel rays suitable to the size of a crystal 32. The incident pulsed beam 24 is diffracted by the acoustic wave 43 which propagates through crystal 32. In FIG. 6A, there is illustrated one of the horizontal video scan line signals within Bragg cell 31. In FIG. 6A, a horizontal line designated by the designator "A" is impressed across length "X" of crystal 32. In this case, "A" represents the time the video horizontal sync (modulated acoustic wave) first enters the Bragg cell 31. The signal (shown exaggerated for clarity) is propagating from the front left to the back right of FIG. 6A. Figure 6B shows the acoustic wave after it has propagated approximately one-half way through crystal 32. As shown in FIG. 6C, the modulated acoustic wave for a single horizontal line has propagated through the crystal 32. During the time the wave bearing the sync at "A" has been propagating through the crystal 32 as illustrated in FIGS. 6A–6C, the system is in a blanking mode. No light will illuminate the modulated wave 43 in the crystal 32. During this blanking period, the information contained in one horizontal scan line is preferably, but not necessarily, compressed, preferably by compressor 53, to the appropriate size to fit within length "X" (FIG. 6A) of crystal 32. The propagation time is equal to H/S. At the time the "A" sync is being absorbed and "A +1" (the next sync pulse) has entered the crystal 32, the laser 11 is pulsed for a time no longer than the pixel time which is (H/S)÷N, where H is one horizontal line time, "S" is a compression ratio and "N" equals the number of pixels. It should be noted that if the light pulse is longer than the required time set out above, then the acoustic waves would be observed in motion which would blur the image. By having the length of time of the light pulse being synchronized with the propogation of one full horizontal scan line to modulate the light pulse, the objective is to, in effect, stop the motion of the acoustic wave after there has been enough time for the information of one horizontal scan line to have propagated into the crystal 32. This effect is achieved by strobing or pulsing the light source 11.

The acoustic-optical crystal 32 is made, preferably, of tellurium oxide $TeO_2$. The usual sound velocity of tellurium oxide is $4.22 \times 10^5$ cm/sec. When a tellurium oxide crystal is cut in a shear mode, the velocity of sound propogated colinearly with the shear cut is approximately $0.617 \times 10^5$ cm/sec. The compressed scan line is equal to the NTSC standard scan line "H"

($H = 63.5 \times 10^{-6}$ seconds) divided by the compression ratio "S" (S=2) which results in a compressed scan line equal to $31.5 \times 10^{-6}$ seconds. Accordingly, the length of the crystal 32 is equal to the sound velocity times the compressed scan line or approximately 19.44 millimeters for the illustration given. Because of the relative length of the modulator and the relatively low radio frequency (approximately fifth megahertz) required, acoustic attenuation is minimized. Also, because of the shear waves, a high resolution can be obtained within a much smaller crystal than the same resolution in an elongated crystal such as the prior art of Yamamoto. The acoustic radio frequency is also lower in the shear mode as discussed above, of, for example, fifth megahertz. The same resolutions for an elongated crystal would require an acoustic wave frequency about twice as much or approximately one hundred megahertz which would contribute significantly to acoustic attenuation.

Multicolor Projector

Figure 2A:
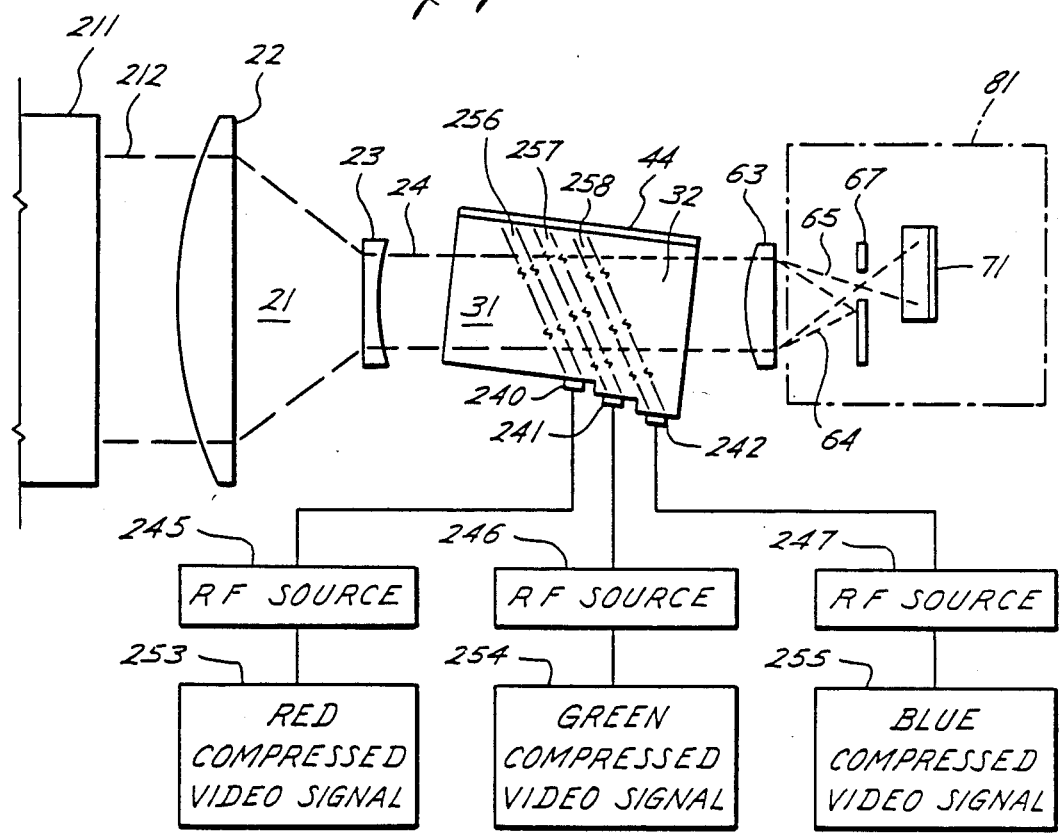
FIG. 2A is a schematic drawing of the imaging system of the preferred embodiment of the present invention using a multicolor set of monochromatic sources.
Figure 2B:
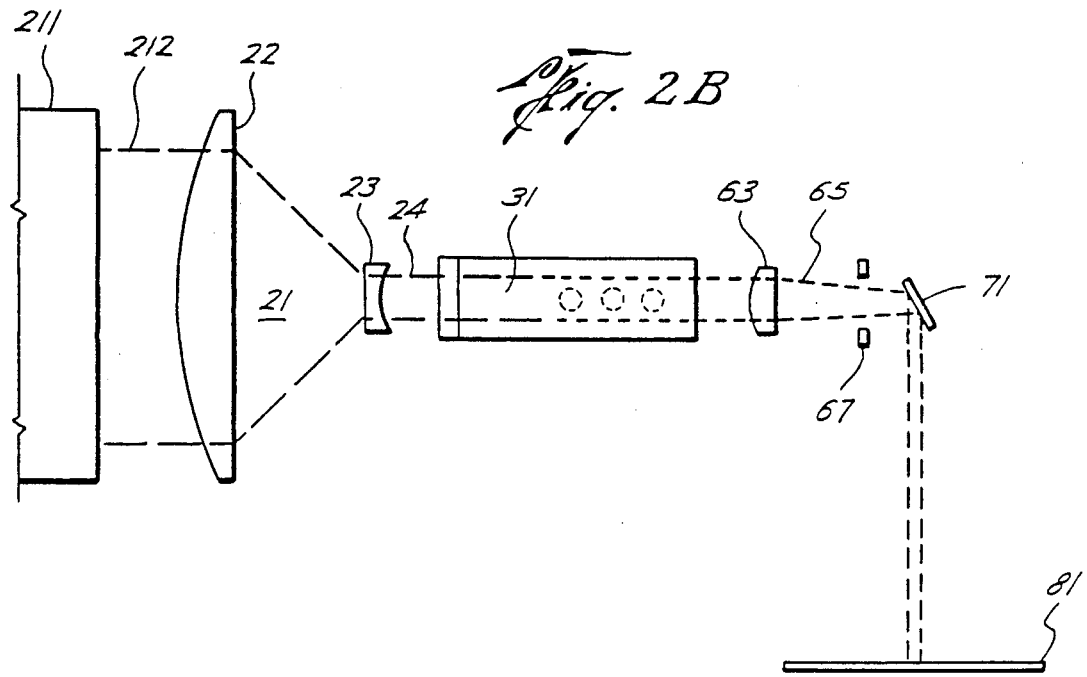
FIG. 2B is a schematic drawing of the imaging system of FIG. 2A rotated ninety degrees.

A several color projector, such as three colors, is show in FIG. 2. Laser light in beam 212 is caused by lasers 211 to incide on crystal 32. Optic system 21 narrows the beam through a series of lenses 22, 23, as discussed above, so that a narrow beam 24 incides on crystal 32 of Bragg cell 31. A series of transducers 240, 241, 242 are driven by a series of RF sources 245, 246, 247, respectively with transducers 240, 241, 242 adhered to crystal 32. RF sources 245, 246, 247 are modulated one horizontal line at a time by compressed video signals from compression systems 253, 254, 255, respectively. These cause acoustic waves 256, 257, 258, respectively, to propagate across crystal 32 to absorber 44, while the laser provides a light pulse when a full horizontal line has propagated into crystal 32 for each color. The width of the light pulse is less than or equal to a pixel of time.

The configuration of FIG. 2 allows the modulation of more than one light beam, each of the light beams being monochromatic and each usually of a different wave length from the others, in a single modulator or Bragg cell 31. A multi-color picture can be displayed if the light beam colors are, for example, three diverse wave lengths, such as wave lengths W1, W2, W3 representing the red, green, and blue primaries. For this purpose, the three radio frequency sources 245, 246, 247 must simultaneously cause the three acoustic waves 256, 257, 258, respectively, to exist simultaneously in crystal 32 for modulating each horizontal line. For this purpose, the acoustic waves 256, 257, 258 are presumed to be constant-frequency, amplitude-modulated signals, having wave lengths T1, T2, T3 respectively. The modulation of the video signals corresponding to radio frequency sources 245, 246, 247 is supplied by the video signal compression systems 253, 254, 255, respectively, after being received from, for example, the air waves or cable by the video system 51.

If the wave lengths of light 212 and the wave lengths of the amplitude modulated acoustic waves 256, 257, 258 are selected to satisfy the equation 2 sin $F_1 = W_1/T_1$; 2 Sin $F_2 = W_2/T_2$; 2 Sin $F_3 = W_3/T_3$, independently, with "$F_i$" (i=1, 2, 3) being equal to the angle of incidence, then the light beams of differing colors from laser light sources 212 will be modulated by the respective acoustic waves separately. In this manner, a full-color display can be projected by utilizing only one modulator or Bragg cell 31. Any combination of laser light sources 211 other than the primary colors may be used to provide other combinations of colors which can provide for multi-color display so long as they satisfy the above relationship.

Multicolor or Monochromatic Lasers

A laser family which meets the needs necessary to obtain the high energy to light efficiency, average power and the appropriate red, green and blue lines to produce a multi-color display, and which is accordingly preferable, is the metal vapor family.

In general, the neutral atoms are excited to the first residence level by electron impact. Although these levels are strongly coupled to the ground state, radiation trapping at densities above about $10^{12}/CM^3$ increases the upper state lifetime. Laser action occurs between levels which are metastable. Build-up of atoms in the lower levels (both by stimulated emission and by direct electron pumping) causes the inversion to cease. After the return of the metastable atoms to the ground state, the laser may be pulsed again. With neon as a buffer gas and appropriate pressure and field strengths, deactivation times are estimated to be less than 25 micro-seconds. Because of the short deactivation times, the laser may be pulsed at high "rep" rates, such as greater than 30,000 Hertz. For an NTSC-standard television format, the required "rep" rate of approximately 15,750 Hertz is easily obtained. The pulse width is approximately 30 to 40 nano-seconds. Another important feature of the metal vapor family of lasers is the energy to light efficiency. This efficiency is at least as good as Nd:Yag lasers and may be better. When producing wave lengths required for full-color video displays, the overall output efficiency is undiminished by any need for using wave length conversion optics such as dye CELLS. Because of average power scaling, the metal vapor laser is capable of very high average power. Fifty watts in single bores and higher, greater than one hundred watts in an amplifier condition, may be achieved.

With regard to obtaining green light for the laser, one should note that NTSC green is centered approximately at 0.540 microns. Green light of approximately 0.510 microns may be produced by using waste heat from the gas discharge which provides the power necessary to vaporize copper present within the plasma tube. Also 0.578 microns yellow light is produced which can be used for a limiting dichroic display or increased luminance.

Other metals that may be suitable to provide the necessary green color besides copper could be manganese which has a wave length of approximately 0.534 microns, lead which has a wave length of approximately 0.537 microns and iron which has a wave length of approximately 0.540 microns. It should be noted that not all of these may lase at high average powers. However, the lower average powers may be used for smaller displays that may be under a total projection luminosity of, or example, one thousand lumens. Because of the technical advances of copper vapor lasers, they will be acceptable for producing the green although any of the other metals could be used.

With regard to the production of red (NTSC red being centered at approximately 0.610 microns) suitable for monochrome, dichroic or multicolor displays, a laser type similar to that described above for the green laser is acceptable but using gold as the vaporized medium. Other metals besides gold that could be used would be calcium which produces wave lengths of approximately 0.610 microns, 0.612 microns and 0.616 microns. However, gold at 0.628 microns is preferable for providing a better color gamut.

With regard to blue light (NTSC blue being centered approximately at 0.470 microns), the metal vapor lasers used could be similar to those for copper and gold except bismuth could possibly be developed as a suitable vaporizing medium. Other possible alternatives would be cadium which has a wave length of x 0.488 microns, beryllium which has a wave length of approximately 0.467 microns, cesium which has a wave length of approximately 0.455 microns, iron which has a wave length of approximately 0.452 microns and indium which has a wave length of approximately 0.451 microns. In this regard, cesium, iron and indium appear to be low in the luminosity efficiency. At this time, no metal vapor pulsed laser capable of producing the same output wattage levels as the red and green metal vapor lasers has been developed. Presently, continuous wave lasers, cavity dumped to produce a pulsed output, can be used in combination with the preferred red and green metal vapor lasers to comprise a multicolor system of acceptable wattage output of all colors. Also, although not preferably, a continuous wave laser of one color used in a continuous mode with a polygonal rotating mirror may be used, in combination with metal vapor lasers of other colors, to produce a multicolor output.

Alternate Dichroic and Multicolor Systems

As shown in FIG. 3, a single laser 311 is provided. Laser 311 would preferably be a metal vapor laser which has a vaporizing metal of, for example, copper having simultaneous differing wave length emissions, such as, for example, 0.510 microns and 0.578 microns for the copper. The wave lengths are separated by a dichroic beam splitter 313 which transmits one wave length, such as, for example, 0.578 microns and reflects the other wave length, such as 0.510 microns. The first wave length 315 which is transmitted by beam splitter 313 is further reflected by a mirror 317 into a beam 319 parallel to beam 321 reflected by beam splitter 313. Beams 319, 321 are processed in parallel. Each beam passes through beam shaping optics 21, and then each beam incides on a separate acoustic-optical modulator or Bragg cell 31. Bragg cells 31 are modulated, as discussed above, by a compressed or noncompressed video signal to modulate the light beams 319, 321, said signal passing through each Bragg cell 31, respectively, one horizontal line at a time. The resultant light beams 323, 325, respectively, incide on projection optics 327, 329, respectively. Projection optics 327, 329 are comprised of lenses 63 and optical slits 67. The resulting beam 331 is reflected by a reflector 333 to a second dichroic beam splitter 335 where it is combined with the beam 337 from projector 327 through dichroic beam splitter 335. The combined beam 339 is reflected by frame scanning mirror 71 and projected onto screen 81.

Referring to FIG. 4, an imaging system using two separate lasers 341, 343 is shown rather than the single laser system of FIG. 3. Laser 341, for example, could be a metal vapor laser which has a vaporizing metal of copper with a wave length of approximately 0.510 microns. Laser 343, could for example, be a metal laser vapor which vaporizes gold and has a wave length of approximately 0.628 microns. Both beams would be used as the primaries of a dichroic display. Beams 319, 321 would be passed through shapers 21 and Bragg cells 31 as discussed above and projectors 327, 329, respectively, to be combined by reflector 333, and dichroic beam splitter 335 to impinge on frame scanning mirror 71 and thus be reflected onto projection surface 81.

Figure 5:
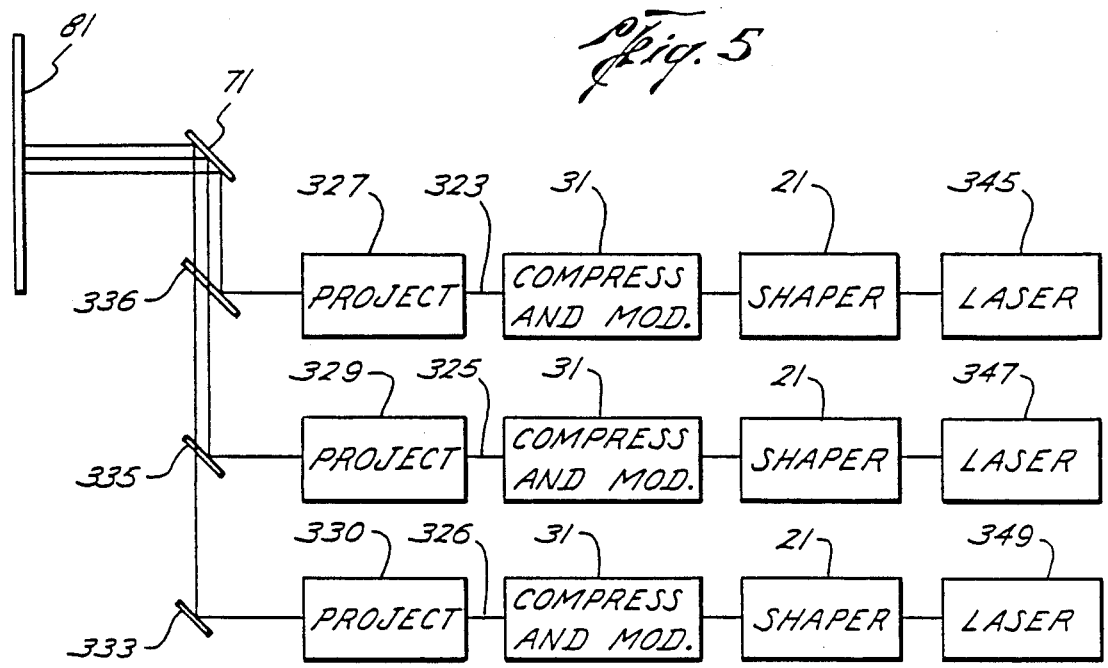
FIG. 5 is a schematic drawing of an alternate embodiment of the present invention utilizing multicolor imaging through multiple monochromatic sources.

Referring to FIG. 5, a set of three monochromatic laser light sources 345, 347, 349 are shown in parallel. Laser 349 may be a metal vapor laser which has a vaporizing metal of copper with a wave length of approximately 0.510 microns. Laser 347 may be a metal vapor laser which vaporizes gold and has a wave length of approximately 0.628 microns. Laser 345 may be a metal vapor laser which vaporizes bismuth and has a wave length of approximately 0.472 microns. The operation of this system is substantially similar to the operation of the system of FIG. 4. The beams from each laser 345, 347, 349 are shaped by shaper optics 21 and modulated by Bragg cells 31. The resultant modulated light beams 323, 325, 326, respectively, incide on projector optics 327, 329, 330, respectively, and the resultant beams are combined by reflector 333, and two dichroic beam splitters 335, 336, with beam splitter 336 permitting the passage of the wave lengths from lasers 347, 349 and reflecting the wave length from laser 345. The combined beam is reflected by frame scanning mirror 71 and is projected on the projection surface 81.

It should be noted that frame scanning mirror 71 may be either a rotating polygonal mirror or be driven by a galvanometer. Either would be synchronized to the vertical field pulse of the video signal which would cause a scan line picture to be offset slightly on the projection surface 81 to produce the picture.

Alternate Writing System

Referring to FIG. 9, as discussed supra, laser light beam 12 emitted by laser 11 incides on acoustic-optical crystal 32. The inciding rays 24 form a narrow beam. Prior to inciding on crystal 32, rays 24 are divided by a beam splitter 26 to form beam 24' which is parallel to beam 24. A mirror 27 is used to cause beam 24' to incide onto crystal 32 of Bragg cell 31. A set of transducers 42, 42- are mounted at different positions on the same side of crystal 32, with acoustic waves 43, 43', respectively, introduced between transducers 42, 42' and absorber 44. The acoustic signals 43, 43' are generated by transducers 42, 42' in response to signals from radio frequency sources 45, 45' connected by cables 47, 47', respectively. Radio frequency sources 45, 45' are modulated, two horizontal lines at a time, by compressed video signals from compression systems 53, 53', respectively. For this purpose, a video collator 91 supplies the compression systems 53, 53' with one horizontal line signal 92 and the next horizontal line signal 93, respectively. For this purpose, the input signal 51 is sampled by the video collator 91 one horizontal line at a time. For example, when the first line is sampled, it is stored by the video collator 91 until the next line is sampled. After the second line is sampled, the video collator sends signals 92, 93, which represent two lines of complete video at the same time. Accordingly, signals 92, 93 cause acoustic waves 43, 43' to propagate across crystal 32 simultaneously to absorber 44, while laser 11 provides a light pulse 12 when the full horizontal lines have propagated completely into crystal 32. As in the previous embodiments, the width of the light pulse is less than or equal to a pixel of time. Accordingly, two modulated output beams 61, 61' exit from crystal 32 to cylindrical lenses 54, 56, respectively. Lenses 54, 56 serve to focus the output beams 61, 61' for display on projection surface 81. The focused light beams 61, 61' exit lenses 54, 56, respectively, and are transmitted to cylindrical lense 58. Lense 58 is used to further focus the light beam set 61, 61' prior to introduction to lense 63. The output from lense 58 is then transmitted to cylindrical lense 63 which is used for output projection. Lense 63 focuses the modulated light beams into light beams 65, 65' which are projected onto optical slit 67. As discussed supra, optical slit 67 is positioned to block undiffracted light 64 exiting from the Bragg cell 31. The light beam set 69, 69' emitting from slit 67 is projected on a frame scanning mirror 71. Frame scanning mirror 71 positions the light signal appropriately onto projection surface or screen 81. For this purpose, after frame scanning mirror 71 reflects signals 69, 69', these signals are transmitted to cylindrical lense 100 which is used to adjust the distance between the parallel output beam set 69, 69' when projected onto projection surface 81.

The video signals 92, 93 may also be supplied by a parallel source, such as a separate video source for each signal respectively, instead of using the video collator 91. This would be used for parallel input. It should also be noted that the multi-line writing is not limited to two lines as described above. This description serves as an illustrative purpose. Any reasonable number of lines could be used, such as three or more.

The multi-line writing allows an increase in the vertical resolution of the projection without increasing band width of the incoming video. For example, if double line writing were used, and the requested output resolution was limited to 525 lines, or NTSC standard, then the light source would only have to pulse once for every two horizontal lines, which would be approximately 8000 HZ. Accordingly, because the laser source 11 would only be required to pulse half as much time, as discussed supra, the operational life of the laser source 11 would be substantially longer.

Also, if the laser source 11 is pulsed at approximately sixteen thousand Hertz which is the rep rate used for displaying a 525-line (NTSC-standard) video picture, and triple line writing is used, then the output vertical resolution could exceed 1500 lines. As discussed above, the input signal scan lines could be from parallel sources rather than a single source.

In addition to the laser source 11 lasting longer, if the repetition rate is reduced, the average laser power can also be increased because a lower repetition rate generally increases laser energy to light efficiency.

The above system of multi-line writing can also be used with multi-color projectors in the same manner as set out in the description of FIG. 2.

Although the system described in detail above is most satisfactory and preferred, many variations in structure and method are possible. Many of these variations have been set out above and are examples of possible changes or variations. Also, for example, the source for any color could consist of more than one laser having substantially the same, or similar, frequency. They are not to be considered exhaustive.

Because many varying and different embodiments may be made within the scope of the inventive concept herein taught and because modification may be made in accordance with the descriptive requirements of the law, it should be understood that the details herein are to be interpreted as illustrative and not in a limiting sense.

What is claimed as invention is:

1. A video imaging system responsive to electrical signals representing a video image, which system comprises in combination:
    (a) a pulsed laser to provide a monochromatic light input beam;
    (b) an acoustical-optical cell, said cell including an anisotropic medium for sound transmittal, the cell having a first face to receive the monochromatic light input beam from the pulsed laser;
    (c) an electrical signal to sound wave transducer mounted on a face other than the said first face of the acoustical-optical cell, the said transducer adapted to produce acoustic sound waves in a sheer mode which are non-collinear with the said monochromatic light input beam and to provide a sound modulated monochromatic output beam from said cell;
    (d) signal means to drive said transducer to produce non-collinear sound waves within said acoustical-optical cell, the sound waves modulated to correspond with the electrical signal for a line of the video image to be projected;
    (e) a projection surface means to display on the surface a video image; and
    (f) sequential plane projection means to provide for substantially all of the sound modulated onto the projection surface whereby each line of the video image is produced at a different physical location on the projection surface.

2. The system of claim 1 wherein the length of the acoustical-optical cell is about equal to the distance the acoustic sound have from said transducer must travel to accommodate one horizontal scan line of the video image.

3. The system of claim 1 which includes acoustic sound wave absorbing means positioned on an opposite face of said medium from said transducer to absorb said sound waves after modulation of said input beam.

4. The system of claim 1 wherein said signal means includes compression means to decrease the time required for the sound waves from said transducer to enter fully the said medium so as to reduce the time direction for a signal representing the line of the video image.

5. The system of claim 1 which includes
    (a) three separate pulsed lasers to provide three separate monochromatic light input beams of red, green and blue into said medium;
    (b) three separate transducers each mounted on a face other than the first face of said medium, each of said sound transducers adapted to produce an acoustical sound wave in a sheer mode which are non-collinear with said input beams and to provide three separate sound modulated output beams from said cell; and
    (c) signal means to provide three separate electrical signals to drive respectively said three transducers to produce three separate, non-collinear sound waves within said cell.

6. The system of claim 5 which includes means for mixing the three modulated output beams to produce a full color video image on the projection surface.

7. A video imaging system responsive to electrical signals representing a video image, which system comprises:
    (a) a plurality of at least three pulsed lasers to provide three separate monochromatic light input beams of red, green and blue;

(b) an acoustical-optical cell for sound transmittal, the cell having a first face to receive the said input beams;

(c) a plurality of at least three electrical signal to sound transducers, each of said transducers corresponding to one of said pulsed lasers, each of the said transducers adapted to produce acoustic sound waves which are non-collinear with the three monochromatic light beams passing through the said cell and oriented to provide at least three sound modulated output beams of red, green and blue from said cell;

(d) signal means to drive each of said transducers, the sound waves of each transducer modulated to correspond with the electrical signals from said transducers at least the three colors red, green and blue for a line of the video image to be projected;

(e) sound absorbing means on the face of the said cell other than the first face to absorb the sound waves after modulation of the input beams;

(f) compression means to reduce the time duration of an electrical signal representing a line of the video image for each monochromatic input beam;

(g) projection surface means to display on the projection surface a color video image; and h) sequential plane projection means to provide for the cell output beams to play onto the projection surface with substantially all of the sound modulated output beams whereby each line of the video image is produced at a different physical location on the projection surface.

8. A method for displaying a video image corresponding to one or more electrical signals representing the images onto a projection surface which method comprises:

(a) receiving one or more electrical signals representing an image;

(b) electrically compressing the time duration of each said electrical signals to decrease the time required for sound waves which correspond to said signals to enter fully an acoustical-optical cell;

(c) converting each line of compressed signals into acoustical sound waves;

(d) substantially simultaneously introducing the compressed acoustical sound waves into an acoustical-optical cell having an anisotropic medium adapted for the transmission of said sound waves;

(e) waiting until a full line of the sound waves for each line of said video image is contained within the said medium;

(f) introducing one or more pulses of separate monochromatic light input beams from a pulsed laser into the said medium for a period of less than the propagation of a pixel in said medium;

(g) modulating the said input beam in the medium by the said sound waves introduced non-collinear with said input beams to obtain from the said medium one or more non-collinear sound modulated monochromatic output light beams;

(h) focusing each line of the said modulated output light beam; and (i) illuminating the portion of the projector surface corresponding to each line with substantially all of the modulated line of said focused output beam to provide a video image on said surface.

* * * * *